March 13, 1934.     E. K. MADAN     1,950,502
COMBINATION DEODORIZER AND DEHUMIDIFIER
Filed Feb. 9, 1933
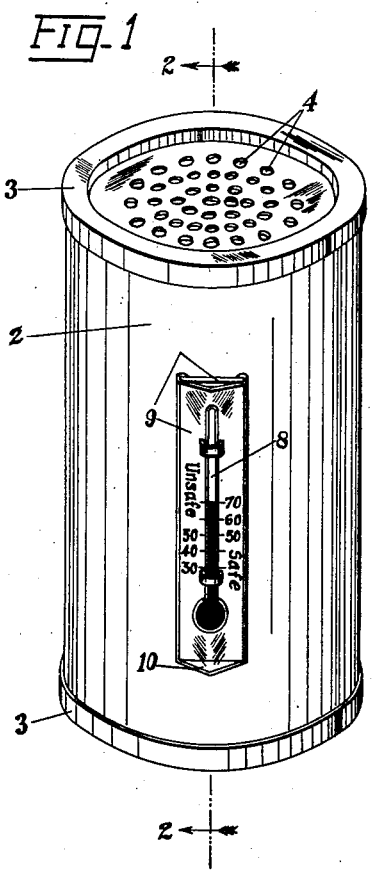
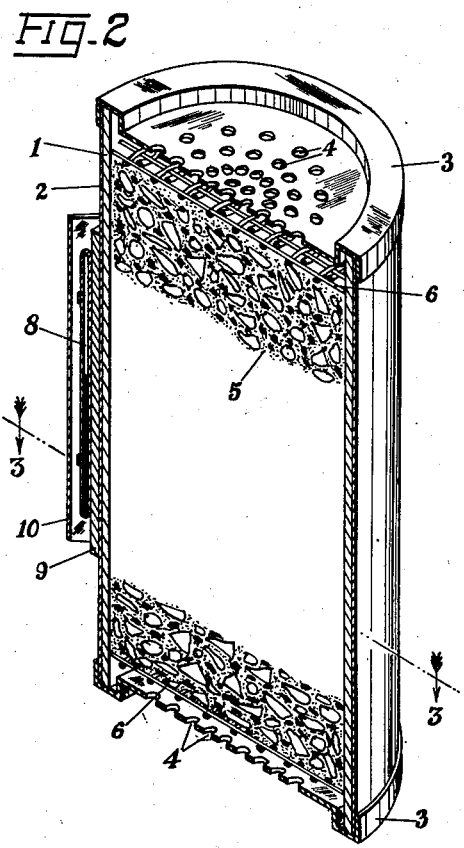
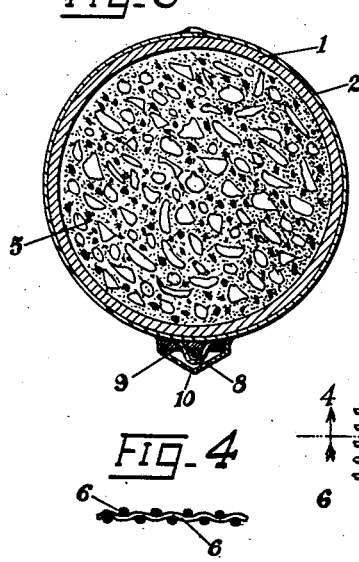
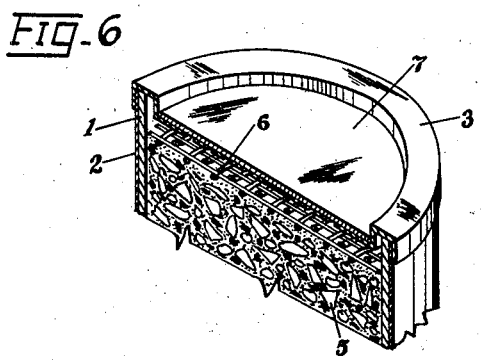
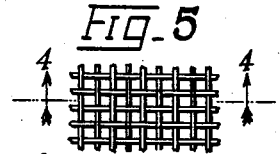
INVENTOR.
EDWARD K. MADAN
BY George L. Sachs
ATTORNEY Patented Mar. 13, 1934

1,950,502

UNITED STATES PATENT OFFICE 1,950,502

COMBINATION DEODORIZER AND DEHUMIDIFIER

Edward K. Madan, Maplewood, N. J.

Application February 9, 1933, Serial No. 655,903

1 Claim. (Cl. 183—4)

My invention relates to improvements in combined deodorizers and dehumidifiers, and while the invention may be used wherever it is desired to remove odors and moisture from the atmosphere of a closed room or a storage place, it is especially adapted for the removal of food odors and moisture from household refrigerators and the like, and will be described with relation to such use. It is understood, however, that I do not restrict or limit the use of my invention solely to household refrigerators.

Devices now in use have disadvantages in that they do not sufficiently confine or store the moisture absorbed, nor are they externally free of condensation and seepage of moisture, nor do they efficiently permit a free circulation of air through the ingredients. Further, they are not equipped with an efficient means for retaining the ingredients in an active condition prior to being put to use.

It is an object of my invention to provide an economical and effective means for removing and destroying odors arising from food and the like which is kept in a closed compartment and for removing the moisture in the atmosphere of such compartment.

Another object of my invention is to provide a combination deodorizer and dehumidifier, so constructed that the deodorizing and dehumidifying ingredients thereof will not deteriorate prior to being put to effective use.

Another object of my invention is to provide a combination deodorizer and dehumidifier, so constructed that the deodorizing and dehumidifying ingredients thereof will retain their active properties much longer than is usual.

Another object of my invention is to provide a combination deodorizer and dehumidifier, so constructed that the device will not become externally moist through condensation or seepage.

These and other objects and advantages will appear from a consideration of the following detailed description and accompanying drawing, in which:

Figure 1 is a projection elevation of my invention when used in household refrigerators.

Figure 2 is a longitudinal section in projection through my invention taken along line 2—2 of Figure 1.

Figure 3 is a cross section through my invention taken along line 3—3 of Figure 2.

Figure 4 shows a conventional detail of a portion of the invention taken along line 4—4 of Figure 5.

Figure 5 is a conventional detail in plan of a portion of the invention.

Figure 6 is a sectional projection detail of a portion of the invention.

Referring to the accompanying drawing, in which similar numerals refer to similar parts throughout the several views, the device consists of an inner tubular container 1 of cylindrical, prismatic, or other desirable section made of an absorbent, porous or bibulous material such as unsized cardboard or blotting paper, and of an outer similar cross-sectioned tubular covering-container 2 made of thin moisture proof material such as celluloid.

Where desired, the celluloid may be transparent to permit printing of directions and instructions on the outer face of the inner container. Each end of the container is covered by a cap 3 also made of a moisture proof material such as celluloid cemented or welded to the outer container 2, and having vents 4 which may be either holes or slots, to permit free circulation of air throughout the ingredients 5 from one end of the device to the other.

Cemented or otherwise secured to the inner face of each cap 3 is a washer or disc 6 of buckram or similar fabric to prevent the loss of any dry ingredients in the container through the vents 4. The cap 3 is preferably formed as shown in Figures 2 and 6 and into the depression on the outer surface thereof there is forced a paper or other suitable washer 7, which paper washer 7 is merely secured in place by the pressure exerted in forcing it into the depression and which may be lifted out with the finger nail or a sharp instrument just prior to the use of the device.

Cemented or welded or otherwise satisfactorily secured to the outside of the container is a thermometer 8 calibrated to a scale 9 showing safe and unsafe food refrigeration temperatures. The thermometer 8 is protected by a transparent protective housing 10 made of celluloid or the like, arranged and cemented to the container.

The ingredients 5 mentioned above are composed of a mixture of deodorizing chemicals, such as activated carbon, and dehumidifying or deliquescent chemicals, such as calcium chloride. The activated carbon absorbs the odors which are given off by various foods and the deliquescent or moisture-absorbing calcium chloride removes the moisture from the surrounding air, the said ingredients being loosely packed in the container described so as to permit the free passage of the odor and moisture-laden air through the device. Deliquescent and moisture-absorbing chemicals such as calcium chloride soon become liquefied by reason of their absorption of the moisture and thus quickly lose their moisture-absorbing properties. In my invention this loss is prevented by the absorbent container which removes the moisture as soon as it is absorbed from the air by the deliquescent chemical used, thus enabling the deliquescent chemical to continue with its function.

It will be seen that I have provided a container, neat in appearance and inexpensive to construct, which permits the efficient application of ingredients such as a mixture of activated carbon and calcium chloride to removing food odors from refrigerators and the like and which permits the retaining of any other odor absorbing, odorous, deliquescent or excurrent material, permitting a safe keeping of the ingredients until required to be used, and providing for the conjoining with it of a suitable protected thermometer to indicate safe and unsafe food refrigeration limits.

I do not wish to be limited to the specific construction shown in the drawing and hereinabove described, as changes may be made therein without departing from the spirit of my invention. The drawing and descriptions are to be considered merely as illustrative of the invention and not as limiting it, and the scope of the invention is to be ascertained by reference to the appended claim.

I claim:

A device for deodorizing and dehumidifying storage compartments and the like, comprising a tubular container made of a bibulous and absorbent material, a tubular moisture-proof holder surrounding said container, a loosely packed mixture of an odor-absorbing material and a deliquescent material in the container and substantially filling the same, a cap made of moisture-proof material and removably secured to each end of the said holder, each of said caps having a portion thereof depressed and perforated, a screen secured to the inner face of each of said caps, and a seal fitting said depression in each cap and removably secured therein.

EDWARD K. MADAN.